(12) United States Patent
Takeda et al.

(10) Patent No.: US 11,448,882 B2
(45) Date of Patent: Sep. 20, 2022

(54) VIRTUAL IMAGE DISPLAY APPARATUS

(71) Applicant: SEIKO EPSON CORPORATION, Tokyo (JP)

(72) Inventors: Takashi Takeda, Suwa (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 471 days.

(21) Appl. No.: 16/555,155

(22) Filed: Aug. 29, 2019

(65) Prior Publication Data
US 2020/0073127 A1 Mar. 5, 2020

(30) Foreign Application Priority Data
Aug. 30, 2018 (JP) .............................. JP2018-161127

(51) Int. Cl.
| | |
|---|---|
| G02B 27/01 | (2006.01) |
| G06F 1/16 | (2006.01) |
| G02B 27/18 | (2006.01) |
| G06F 3/01 | (2006.01) |
| G02B 27/09 | (2006.01) |

(52) U.S. Cl.
CPC ..... *G02B 27/0172* (2013.01); *G02B 27/0916* (2013.01); *G02B 27/18* (2013.01); *G06F 1/163* (2013.01); *G06F 1/1639* (2013.01); *G06F 3/013* (2013.01)

(58) Field of Classification Search
CPC . G02B 27/0172; G02B 27/0916; G02B 27/18
See application file for complete search history.

(56) References Cited

U.S. PATENT DOCUMENTS 6,046,857 A    4/2000 Morishima
2016/0357016 A1* 12/2016 Cakmakci .......... G02B 27/0172

FOREIGN PATENT DOCUMENTS

JP    H09-189880 A    7/1997

* cited by examiner

*Primary Examiner* — Joseph P Martinez
(74) *Attorney, Agent, or Firm* — Oliff PLC

(57) ABSTRACT

A virtual image display apparatus includes a display device serving as an image forming unit, an image optical system including a first mirror member serving as an outer mirror member and receiving imaging light from the display device, and a partially reflecting type mirror portion reflecting imaging light emitted from the image optical system toward a position of an exit pupil. The first mirror member serving as the outer mirror member and the partially reflecting type mirror portion are integrated.

24 Claims, 12 Drawing Sheets

VIRTUAL IMAGE DISPLAY APPARATUS

The present application is based on, and claims priority from JP Application Serial Number 2018-161127, filed on Aug. 30, 2018, the disclosure of which is hereby incorporated by reference herein in its entirety.

BACKGROUND

1. Technical Field

The present disclosure relates to a virtual image display apparatus such as a head-mounted display including a mirror member, and more particularly to a virtual image display apparatus that is configured to provide a see-through view.

2. Related Art

In recent years, various types of a virtual image display apparatus in which imaging light from a display element is guided to pupils of an observer by an optical element such as a mirror or a light guide are proposed as a virtual image display apparatus, which enables formation and observation of a virtual image, like a head-mounted display.

An optical system described in JP-A-9-189880 is constituted by four eccentric curved mirrors. A first eccentric curved mirror has a rotating elliptic surface or an aspheric surface based on a rotating elliptic surface, and a second eccentric curved mirror has a hyperboloid or an aspheric surface based on a hyperboloid. The plurality of eccentric curved mirrors are disposed in a vertical direction with reference to a face, for example. Weight reduction is more easily achieved by constituting the optical system with the eccentric curved mirror than when a light guide is used.

The optical system in JP-A-9-189880 is constituted by the eccentric curved mirrors, and thus another eccentric curved mirror is disposed adjacent to the eccentric curved mirror in front of the eye. As a result, when the eccentric curved mirror in front of the eye is imparted with transparency to secure a see-through view, a see-through visual field may be inhibited by a support of the eccentric curved mirror in front of the eye, another eccentric curved mirror, or the like.

SUMMARY

A virtual image display apparatus according to an aspect of the present disclosure includes an image forming unit, an image optical system including an outer mirror member and configured to receive imaging light from the image forming unit, and a partially reflecting type mirror portion configured to reflect imaging light emitted from the image optical system toward a position of an exit pupil. The outer mirror member and the partially reflecting type mirror portion are integrated.

BRIEF DESCRIPTION OF THE DRAWINGS

FIG. 3 is a side cross-sectional view illustrating an arrangement relationship and the like between constituent components of the apparatus illustrated in FIG. 1 and the like.

DESCRIPTION OF EXEMPLARY EMBODIMENTS

First Exemplary Embodiment

Below, a virtual image display apparatus according to a first exemplary embodiment according to the present disclosure will be described with reference to FIGS. 1 to 3 and the like.

Figure 1:
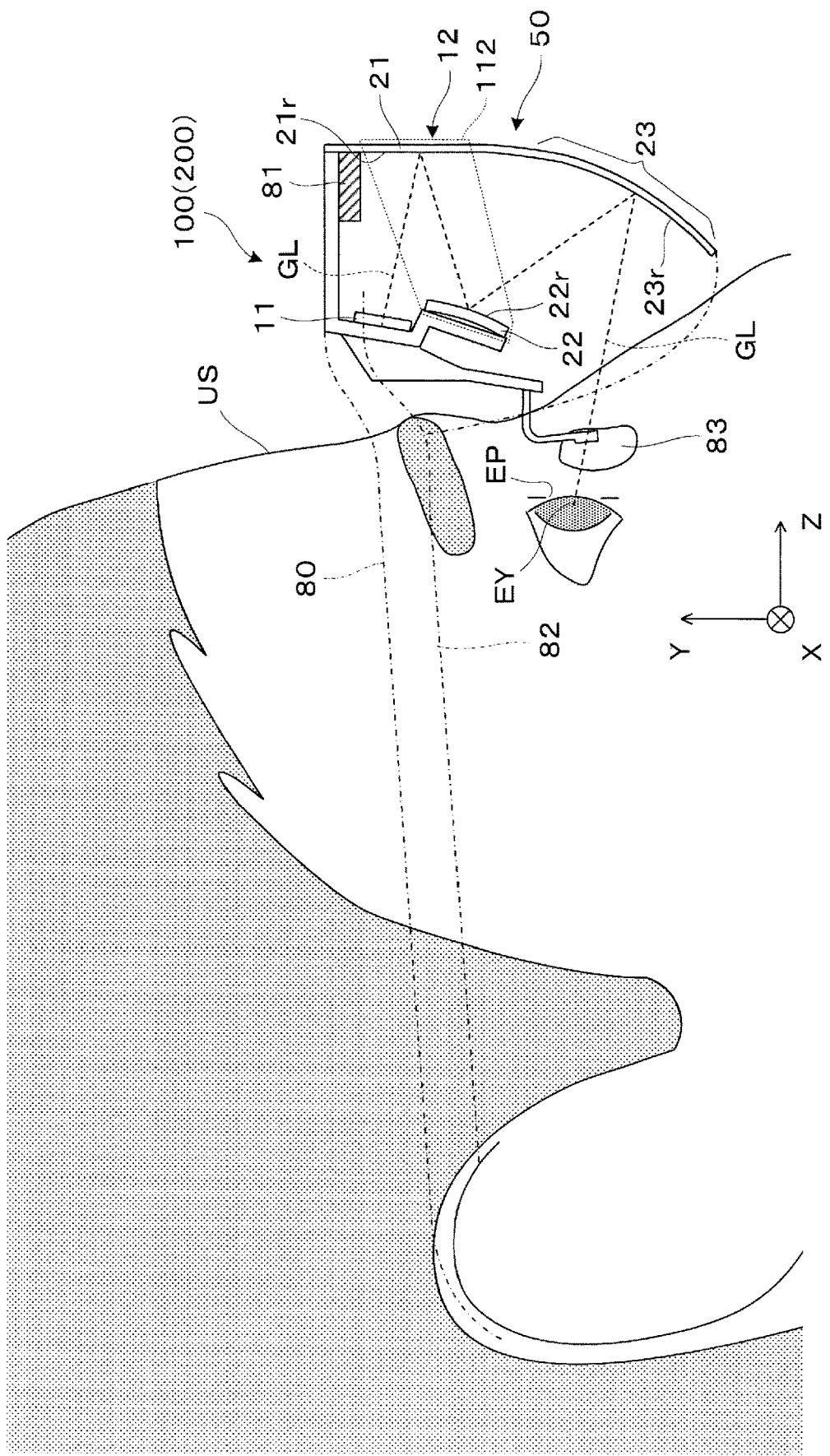
FIG. 1 is a side cross-sectional view illustrating a virtual image display apparatus according to a first exemplary embodiment.
Figure 2:
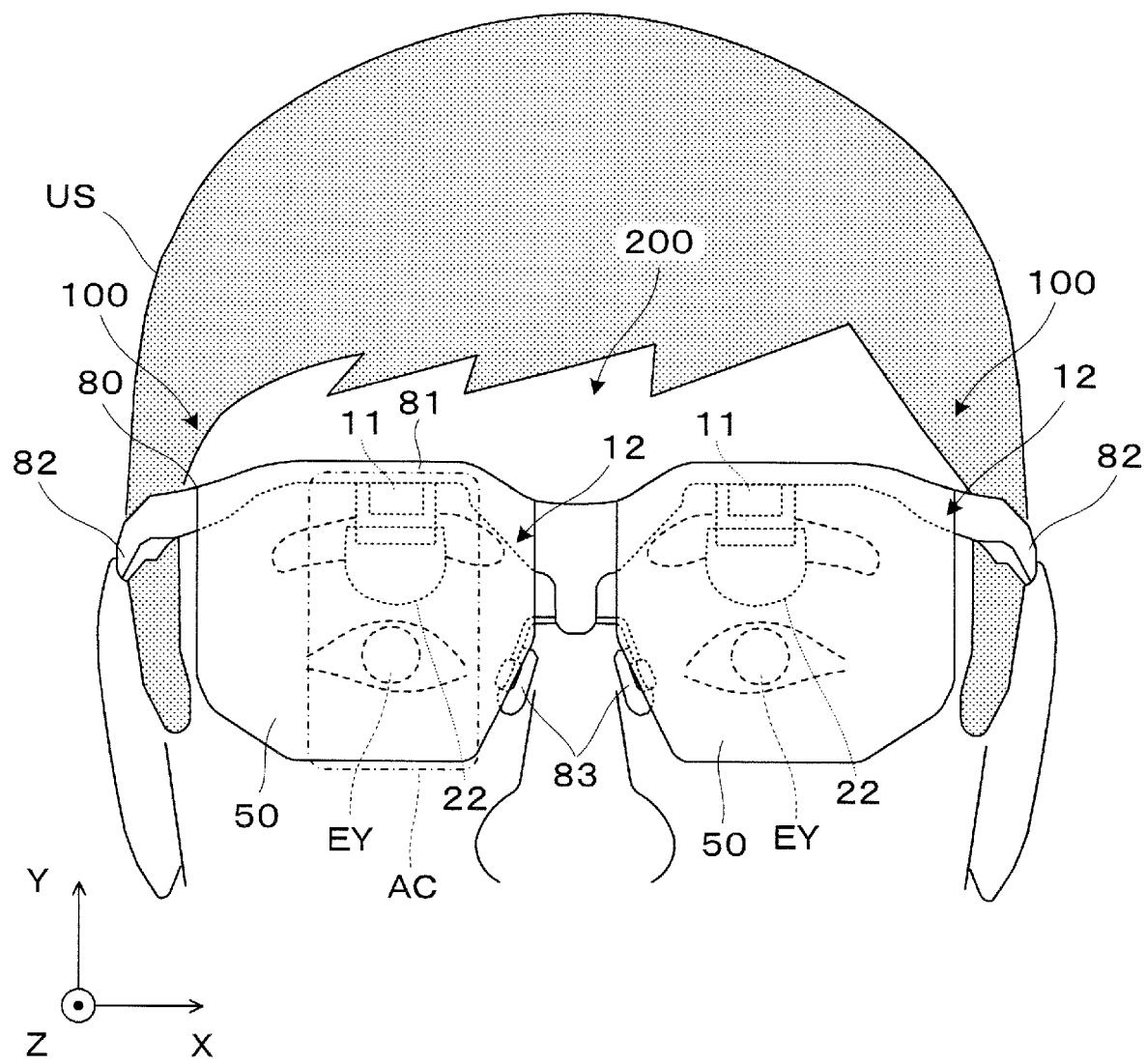
FIG. 2 is a front view illustrating the virtual image display apparatus according to the first exemplary embodiment.
Figure 3:
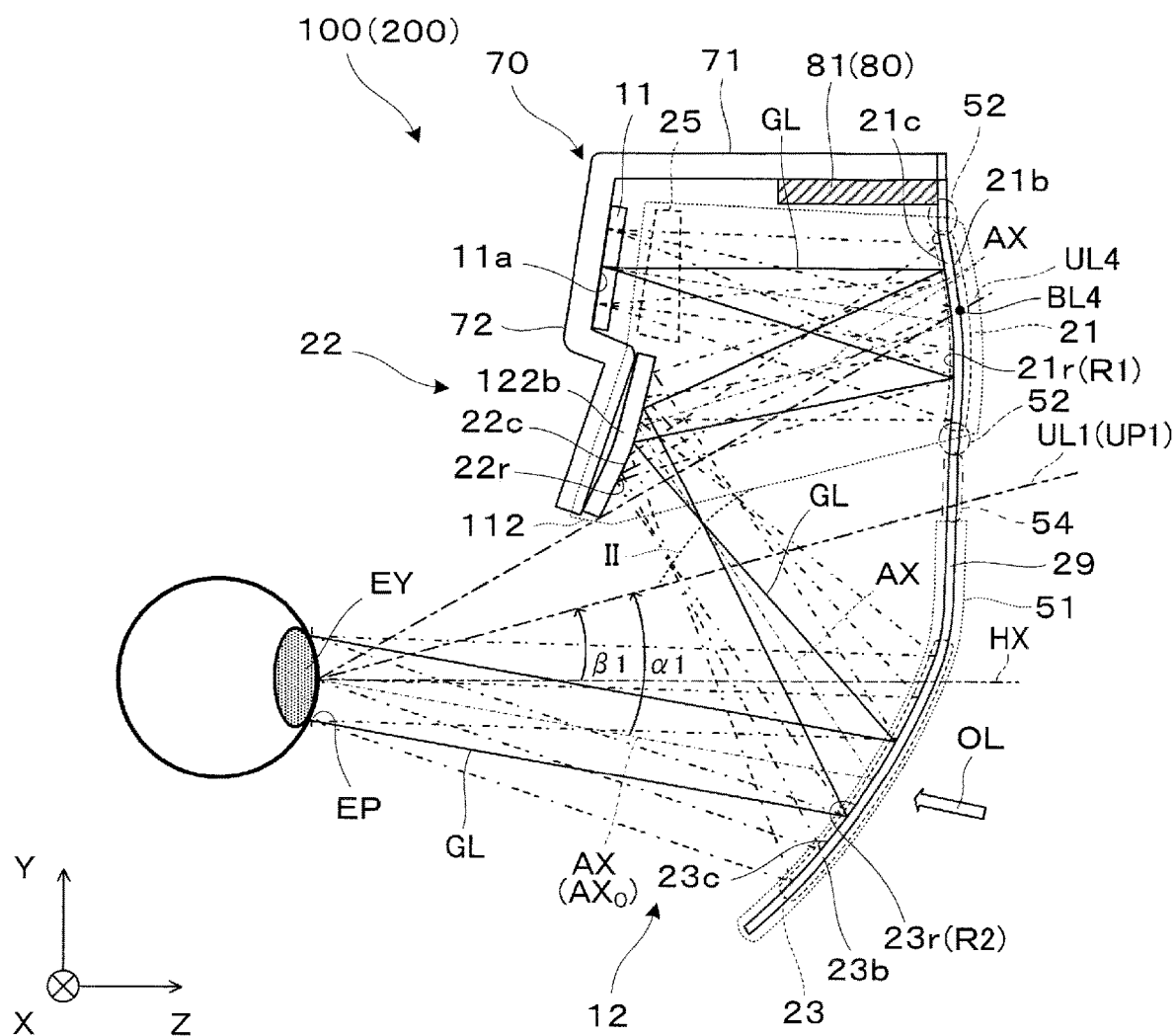

In FIGS. 1 to 3, X, Y, and Z are an orthogonal coordinate system, an X direction corresponds to a lateral direction in which both eyes of an observer US wearing a virtual image display apparatus 100 are aligned, a Y direction corresponds to an upward direction orthogonal to the lateral direction in which both eyes of the observer US are aligned, and a Z direction corresponds to a front direction of the observer US or a front surface direction.

The illustrated virtual image display apparatus 100 is a head-mounted display, and causes the observer US to recognize video as a virtual image. The virtual image display apparatus 100 includes a display device 11 and a projection optical system 12. The projection optical system 12 includes a first mirror member 21, a second mirror member 22, and a partially reflecting type mirror portion 23. Of these, the first mirror member 21, which is an outer mirror member, and the second mirror member 22, which is an inner mirror member, constitute an image optical system 112. Further, the first mirror member 21 and the partially reflecting type mirror portion 23 constitute a part of a front cover member 50, which is an external member, and the first mirror member 21 and the partially reflecting type mirror portion 23 are vertically aligned and integrated. The front cover member 50, from the perspective of including and integrating the first mirror member 21 and the partially reflecting type mirror portion 23, may be referred to as a dual-surface reflection member, and may also be referred to as a front cover reflection member. The front cover member 50 is disposed in a state of being positioned on an outer side or an external side of the display device 11 and the second mirror member 22 with respect to the display device 11 and the like. The front cover member 50 has an outline having a shape of eyeglasses, and has a curved shape being convex outward over the eyes of the observer US. FIGS. 1 and 3 illustrate only the virtual image display apparatus 100 for the right eye, but the virtual image display apparatus 100 for the left eye has the same structure, and a virtual image display apparatus 200 having an appearance like eyeglasses as a whole is formed by combining the virtual image display apparatuses 100 for both eyes. Note that, one of the portions for the right eye and the left eye may be omitted from the virtual image display apparatus 200 for both eyes, and, in this case, a one-eye head-mounted display is obtained.

Note that, as illustrated in FIG. 3, a lens 25 can be disposed between the display device 11 and the first mirror member 21. The lens 25 is a part of the projection optical system 12 and has a role in reducing aberrations of the projection optical system 12. The lens 25 may have a wedge angle in the vertical YZ cross section in view of imparting a function of trapezoidal correction. Further, in terms of adjusting vertical/horizontal telecentric characteristics, the lens 25 can have different optical powers in vertical and horizontal directions. The lens 25 may be formed of a material having an Abbe number greater than or equal to 50 in terms of suppressing occurrence of color aberrations.

Referring back to FIG. 1 and the like, a frame 80 has a structure similar to that of eyeglasses, and includes a side-piece portion 82 coupled to a lateral end portion of a body member 81, and a nose pad 83 at a tip of a metal fitting extending from the center of the body member 81.

In describing the optical path, an imaging light GL from the display device 11 is incident on the first mirror member 21, which is an outer mirror member, and is reflected at a high reflectance close to 100% by a reflecting surface 21r that forms a first reflecting region R1. The imaging light GL reflected by the first mirror member 21 is incident on the second mirror member 22 and reflected at a high reflectance close to 100% by a reflecting surface 22r. The imaging light GL reflected by the second mirror member 22 is incident on the partially reflecting type mirror portion 23 and reflected at a reflectance of less than or equal to approximately 50% by a reflecting surface 23r that forms a second reflecting region R2. The imaging light GL reflected by the partially reflecting type mirror portion 23 is incident on an exit pupil EP in which a pupil EY of the observer US is disposed.

With reference to FIG. 3, the virtual image display apparatus 100 includes an upper cover member 70 that is a body cover member fixed to a body member 81 of the frame 80. The upper cover member (body cover member) 70 is coupled to the front cover member 50 and covers the display device (image forming unit) 11 and the second mirror member 22. An upper side wall portion 71 of the upper cover member 70 is fixed to the body member 81 by an adhesive or a fastener. The display device 11, which is an image forming unit, and the second mirror member 22 are fixed vertically adjacent to each other to a rear wall portion 72 of the upper cover member 70. The display device 11 (image forming unit) and the second mirror member 22 are fixed to the rear wall portion 72 by an adhesive or a fastener on a rear surface side of the display device 11 and the second mirror member 22. As a result, the second mirror member 22 is fixed at an upper end and is suspended by the upper cover member (body cover member) 70. This makes it easier to avoid disposing an object that obstructs the visibility on a lower end or to the left and right of the second mirror member 22. The first mirror member 21 and the partially reflecting type mirror portion 23 are directly fixed to the body member 81 of the frame 80 as a part of the front cover member 50. The first mirror member 21 and the partially reflecting type mirror portion 23 are integrated as a part of the front cover member 50.

Figure 4:
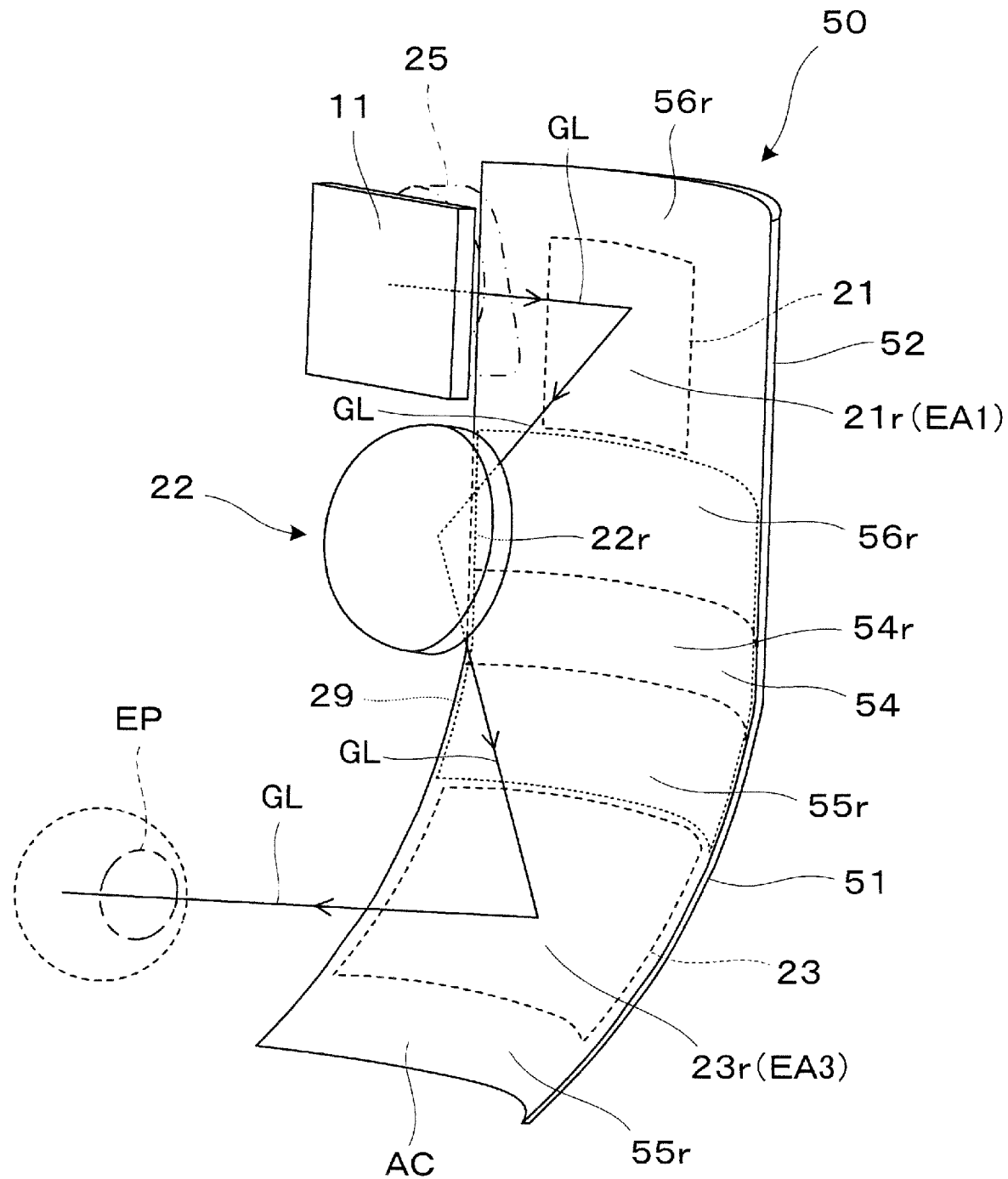
FIG. 4 is a perspective view illustrating an arrangement relationship between a main portion of a front cover member and other optical elements.

FIG. 4 illustrates a center region AC of the front cover member 50 for the right eye illustrated in FIG. 2. The front cover member 50 has an overall uniform thickness, and is disposed on the front side of the exit pupil EP. The reflecting surface 21r of the first mirror member (outer mirror member) 21 and the reflecting surface 23r of the partially reflecting type mirror portion 23 are formed vertically separated from each other on the front cover member 50, and the front cover member 50 may be referred to as a dual-surface reflection member or a front cover reflection member. The reflecting surface 21r is formed in a region corresponding to an effective region EA1 of the first mirror member 21, and the reflecting surface 23r is formed in a region corresponding to an effective region EA3 of the partially reflecting type mirror portion 23. The first mirror member 21 and the partially reflecting type mirror portion 23 are continuously joined via a coupling portion 29 extending between the first member 21 and the partially reflecting type mirror portion 23. The coupling portion 29 includes a gradation region 54 described later.

Figure 5:
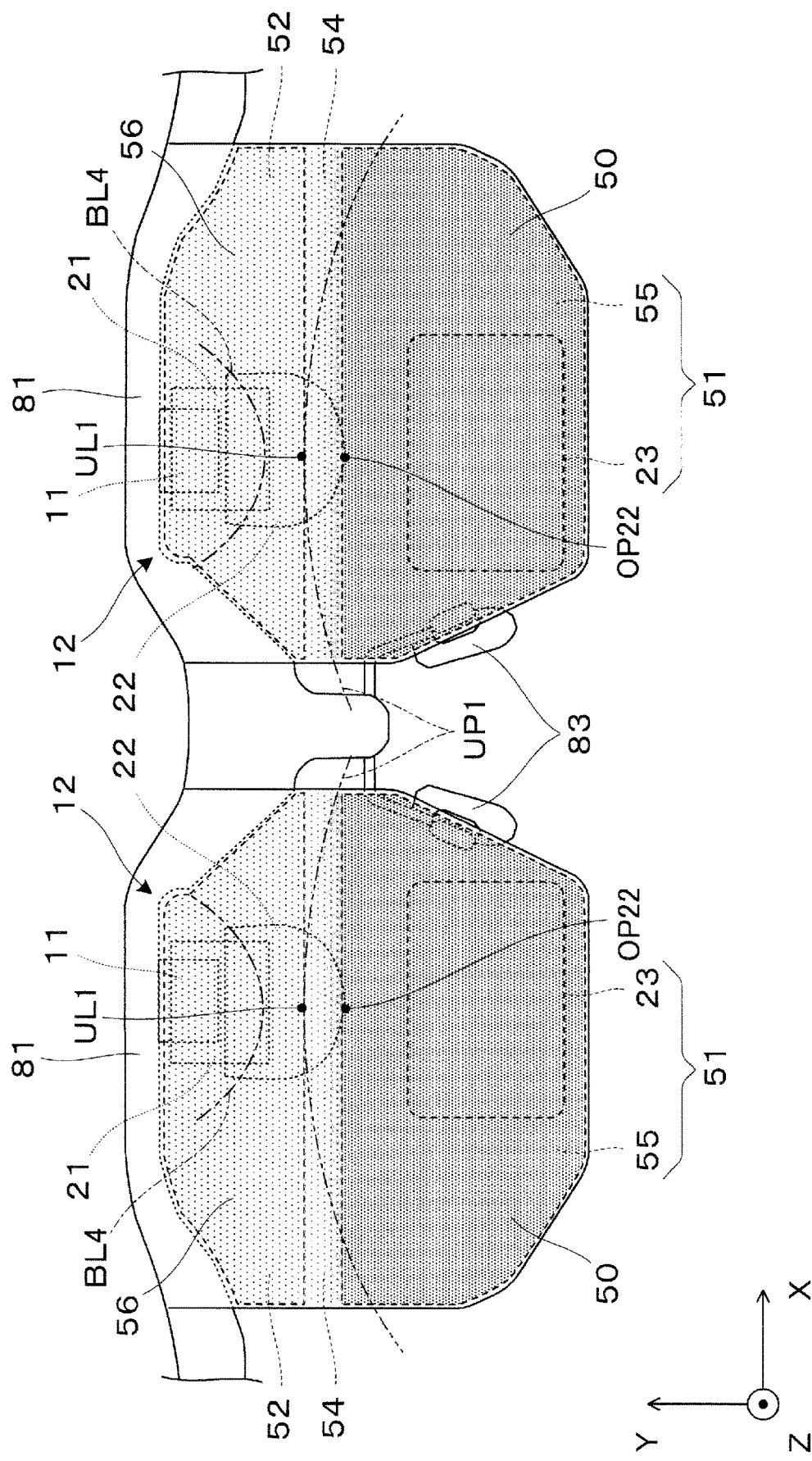
FIG. 5 is a front view illustrating the front cover member.

As illustrated in FIGS. 4 and 5, a transmissive region 51, which is a part of the front cover member 50, includes and extends outward from the partially reflecting type mirror portion 23 from the perspective of securing a see-through view. That is, the transmissive region 51 includes the partially reflecting type mirror portion 23 as a part of the transmissive region 51, and extends around, that is, above, below, and to the left and right of, the reflecting surface 23r of the partially reflecting type mirror portion 23. The transmissive region 51 is configured to contribute to the formation of a virtual image or a projected image from the perspective of including the partially reflecting type mirror portion 23, and has a role in imparting optical transparency in a see-through view of the partially reflecting type mirror portion 23 and the transmissive region 51. In that sense, the transmittance of the transmissive region 51 may be set to from 10% to 90%, practically from 20% to 90%, with reference to visible light, and is normally set to from 50% to 80%. In the case of this exemplary embodiment, an external-light transmissive region 55 is provided around the partially reflecting type mirror portion 23 in the transmissive region 51. More specifically, the region of the transmissive region 51 excluding the partially reflecting type mirror portion 23 is the external-light transmissive region 55. The external-light transmissive region 55 is formed with a reflecting surface 55r obtained by extending the partially transmissive type or semi-transmissive reflecting type surface 23r of the partially reflecting type mirror portion 23. As a result, it is possible to prevent a location where the transmittance changes stepwise between the external-light transmissive region 55 and the partially reflecting type mirror portion 23 to be formed, and the transmissive region 51 is recognized as a portion or a region having uniform transmittance and reflectance from outside. A light blocking region 52 is formed on an upper side of the transmissive region 51. The light blocking region 52 includes the first mirror member 21 as a part of the light blocking region 52, and extends around, that is, above, below, and to the left and right of, the reflecting surface 21*r* of the first mirror member 21. The front cover member 50 is formed by integrating the transmissive region 51 including the partially reflecting type mirror portion 23 and the external-light transmissive region 55, and the light blocking region 52 including the first mirror member (outer mirror member) 21. In the case of this exemplary embodiment, an external light blocking region 56, which excludes the first mirror member 21 of the light blocking region 52, is formed with a reflecting surface 56*r* obtained by extending the total-reflection type reflecting surface 21*r* of the first mirror member 21. The light blocking region 52, that is, the first mirror member 21 and the external light blocking region 56, does not have internal total reflection by refractive surface, but has total-reflection type reflection characteristics by the reflective film.

In the front cover member 50, the gradation region 54 having a band shape is formed and integrated between the transmissive region 51 and the light blocking region 52. The transmittance of the gradation region 54 is equal to the transmittance of an upper end of the transmissive region 51 at a lower end of the gradation region 54, and is equal to the transmittance of a lower end of the light blocking region 52 at an upper end of the gradation region 54. That is, the optical state continuously changes from the light blocking region 52 to the transmissive region 51, resulting in a continuous change in the optical state from the first mirror member (outer mirror member) 21 to the partially reflecting type mirror portion 23. A reflecting surface 54*r* similar to the reflecting surface 21*r* of the first mirror member 21 is formed at the gradation region 54, and the reflectance of the reflecting surface 54*r* gradually changes in accordance with the position in the vertical direction. As a result, the transmissive region 51 and the light blocking region 52 are disposed sandwiching the gradation region 54, the transmittance and the reflectance continuously gradually change from the transmissive region 51 to the light blocking region 52, and the reflectance and transmittance continuously gradually change from the partially reflecting type mirror portion 23 to the first mirror member (outer mirror member) 21. With the band-shaped gradation region 54 thus provided between the transmissive region 51 and the light blocking region 52, the front cover member 50 is recognized from outside as an integral member in which not only is the transmittance high on a lower side and low on an upper side, but an upper and lower boundary is blurred.

With the transmissive region 51 and the gradation region 54 causing at least partial passage of external light OL, the observer US can have a see-through view of externals. The transmissive region 51 and the gradation region 54 have a macroscopically uniform thickness and substantially no optical power with respect to transmitted light. More particularly, the partially reflecting type mirror portion 23, the external-light transmissive region 55, and the gradation region 54 have substantially no optical power with respect to transmitted light. From a different perspective, the coupling portion 29 outside the effective region EA1 of the first mirror member 21 and the effective region EA3 of the partially reflecting type mirror portion 23, that is, the coupling portion 29 extending between the partially reflecting type mirror portion 23 and the first mirror member (outer mirror member) 21 has substantially no optical power with respect to the transmitted light. With the transmissive region 51 and the gradation region 54 thus having substantially no optical power with respect to the transmitted light, it is possible to suppress distortion of an external image observed through the transmissive region 51 and the gradation region 54, for example, through the partially reflecting type mirror portion 23, the coupling portion 29, and the gradation region 54.

In a specific preparation example, in a case where a width in the Y direction of the gradation region 54 is, for example, about 2 mm or greater and thus set to 5 mm, for example, the reflectance of the external-light transmissive region 55 is approximately 50%, and the reflectance of the first mirror member 21 is approximately 100%, the reflectance on the lower end or the −Y end side of the gradation region 54 is approximately 50%, the reflectance on the upper end or the +Y end side of the gradation region 54 is approximately 100%, and the reflectance between the lower end and the upper end is made to change at a uniform rate. Note that the reflectance of the external-light transmissive region 55 can be made to match the reflectance of the partially reflecting type mirror portion 23, but can also be made to differ from the reflectance of the partially reflecting type mirror portion 23.

As illustrated in FIG. 3, the gradation region 54 of the front cover member 50 extends to a position greater than or equal to 15° upward from a center axis HX corresponding to the horizontal direction, from the perspective of securing a see-through view. That is, given a virtual first reference line UL1 extending diagonally upward, parallel with the YZ plane, from a center of the exit pupil EP, toward the direction of an angle $\beta 1$ of 15° relative to the center axis HX, the gradation region 54 of the front cover member 50 is formed until this first reference line UL1 is reached.

In the above, the arrangement relationship was described in the YZ cross section, but a similar relationship may be established in the X direction as well. Specifically, given a virtual first reference plane UP1 extending in parallel with the first reference line UL1 and the X axis, diagonally above the center of the exit pupil EP, the gradation region 54 of the front cover member 50 may be disposed below the first reference plane UP1.

The first reference line UL1 can be set with reference to the direction of a screen center or an exit-side optical axis AXo rather than with reference to the horizontal direction. That is, in this case, the first reference line UL1 has an angle $\alpha 1$ of 25° relative to the exit-side optical axis AXo corresponding to the screen center, and the gradation region 54 extends to a position equal to or upward from the first reference line UL1 corresponding to 25° upward from the screen center with reference to the exit pupil EP. The above relationship may also be established in the X direction in an approximate manner, and the gradation region 54 extends to a position equal to or upward from the first reference plane UP1 corresponding to 25° upward from the screen center with reference to the exit pupil EP.

Without being limited to the gradation region 54, the upper end of the transmissive region 51 may extend to a position equal to or above the virtual first reference line UL1 or first reference plane UP1 extending toward the direction of the angle $\beta 1=15°$ relative to the center axis HX, from the perspective of widening the see-through visual field.

Note that the angle $\beta 1$ of the first reference line UL1 or the first reference plane UP1 may be 25° or greater from the perspective of securing the see-through visual field. Note that the angle $\alpha 1$ may be 35° or greater from the perspective of securing the see-through visual field.

The gradation region 54 need only extend to a position of 55° upward from the horizontal direction or a position of 65° upward from the screen center, as an upper limit, with reference to the exit pupil EP. This is because the upper limit of visibility of a person is, at most, about 55° above the horizontal view, and an object separated by 45° or greater above the horizontal view is not a concern.

In the exemplary embodiment described above, the exit-side optical axis AXo corresponding to the screen center is set to 10° downward relative to the center axis HX in the horizontal direction. This is because the line of sight of a person is stable in a slightly downcast state tilted approximately 10° below the horizontal direction. Note that the center axis HX in the horizontal direction relative to the exit pupil EP is assumed to when the observer US wearing the virtual image display apparatus 100 relaxes in an upright posture and gazes in a horizontal direction or a horizontal line facing the front. While a shape and a posture of the head, including the disposition of the eyes, the disposition of the ears, and the like, of each individual observer US wearing the virtual image display apparatus 100 are varied, the average center axis HX can be set for the virtual image display apparatus 100 by assuming an average head shape or head posture of the observer US and, with this as the typical or representative center axis HX, the first reference line UL1 and the first reference plane UP1 corresponding to the angle β1 can be determined.

The shapes and arrangements of the transmissive region 51 and the gradation region 54 can be changed as appropriate in accordance with specifications and the like of the virtual image display apparatus 100. For example, the transmissive region 51 does not need to extend above the partially reflecting type mirror portion 23 and, in this case, the gradation region 54 can be formed from the upper end of the partially reflecting type mirror portion 23. Also, of the transmissive region 51, the external-light transmissive region 55 extending to the left and right and to the lower side of the partially reflecting type mirror portion 23 is also not limited to the illustrated region and, for example, a light blocking region (not illustrated) can be provided to the left and right, and below the partially reflecting type mirror portion 23, and a gradation region can be provided between this light blocking region and the partially reflecting type mirror portion 23. In this case, in the front cover member 50, the transmissive region 51 is constituted only by the partially reflecting type mirror portion 23, with a state in which the gradation region is formed surrounding the transmissive region 51 and a state in which the light blocking region is formed surrounding the outer side of the gradation region.

The transmittance of the transmissive region 51 of the front cover member 50 need only be secured to 40° or 50° below the exit-side optical axis AXo corresponding to the screen center. That is, in a case where the transmissive region 51 extends 40° or greater below the exit-side optical axis AXo corresponding to the screen center, transmittance need not be secured in the region exceeding 50° corresponding to an induced visual field that is larger, by a predetermined amount, than the 40° corresponding to a stable visual field below the exit-side optical axis AXo. Note that in cases where the transmissive region 51 has a span of approximately 65° on the lower side or the −Y side of the 10° downward exit-side optical axis AXo, the transmissive region 51 can correspond to the movement of the eye as well, which is thus more preferable. In a case where the exit-side optical axis AXo extends in the horizontal direction, the transmissive region 51 may have a span of approximately 40° below the exit-side optical axis AXo corresponding to the induced visual field and, from the perspective of widening the visual field, may have a span of about 75° below the exit-side optical axis AXo.

The transmissive region 51 may have a span of about ±50° corresponding to a stable visual field on the left and right sides or ±X sides of the exit-side optical axis AXo. In cases where the transmissive region 51 has a span of about ±100° on the left and right sides or the ±X sides of the exit-side optical axis AXo, the transmissive region 51 can correspond to the movement of the eye as well, which is thus more preferable. Note that the visual field in the diagonal direction may have a longitudinal and lateral intermediate span, and it may, in general, have, as the transmissive region 51, an area covering an oval region that is laterally long.

The gradation region 54 extends upward from a lower end position of the second mirror member 22 (refer to FIGS. 3 and 5). Furthermore, the gradation region 54 and the transmissive region 51 are formed below a boundary line BL4 defined by a line UL4 projecting a lower edge of the second mirror member 22, which is an inner mirror member, with reference to the exit pupil EP. As a result, it is possible to avoid obstruction of the visibility of the gradation region 54 and the transmissive region 51 by the second mirror member 22 while widening the upper visibility to the gradation region 54.

Based on the assumption that the front cover member 50 is observed from the front direction, a lateral width in the X direction of the second mirror member 21 is wider than a lateral width in the X direction of the first mirror member 21 (refer to FIGS. 2 and 5). While an intermediate image II is formed around the second mirror member 21, this is associated with a wide angle of view in the lateral direction. Further, the first mirror member 21 and the second mirror member 22 are disposed partially overlapping in the horizontal direction (refer to FIGS. 3 and 5) and, based on the assumption that the front cover member 50 is observed from the front direction, an upper end of the second mirror member 22 is in a state being disposed behind the lower end of the first mirror member 21.

With reference to FIG. 3, the display device 11 is an image forming unit, and is disposed closer to the top or closer to the +Y of the projection optical system 12 corresponding to closer to the head of the observer US. The display device (image forming unit) 11 is a self-luminous type display element typified by, for example, an organic electro-luminescence (organic EL), an inorganic EL, an LED array, a laser array, a quantum dot emission type element, and the like, and forms a still image or a moving image in color on a two-dimensional display surface 11a. The display device 11 is driven by a drive control circuit (not illustrated) and performs a display operation. When an organic EL display is used as the display device 11, the display device 11 is configured to include an organic EL control unit. When a quantum dot display is used as the display device 11, the display device 11 is configured to emit green or red color by causing light of a blue light emitting diode (LED) to pass through a quantum dot film. The display device 11 is not limited to a self-luminous display element, and may be constituted by an LCD or another light modulating element, and may form an image by illuminating the light modulating element with a light source such as a backlight. As the display device 11, a liquid crystal on silicon (LCOS, LCoS is a trade name), a digital micromirror device, and the like may be used instead of the LCD.

Figure 6:
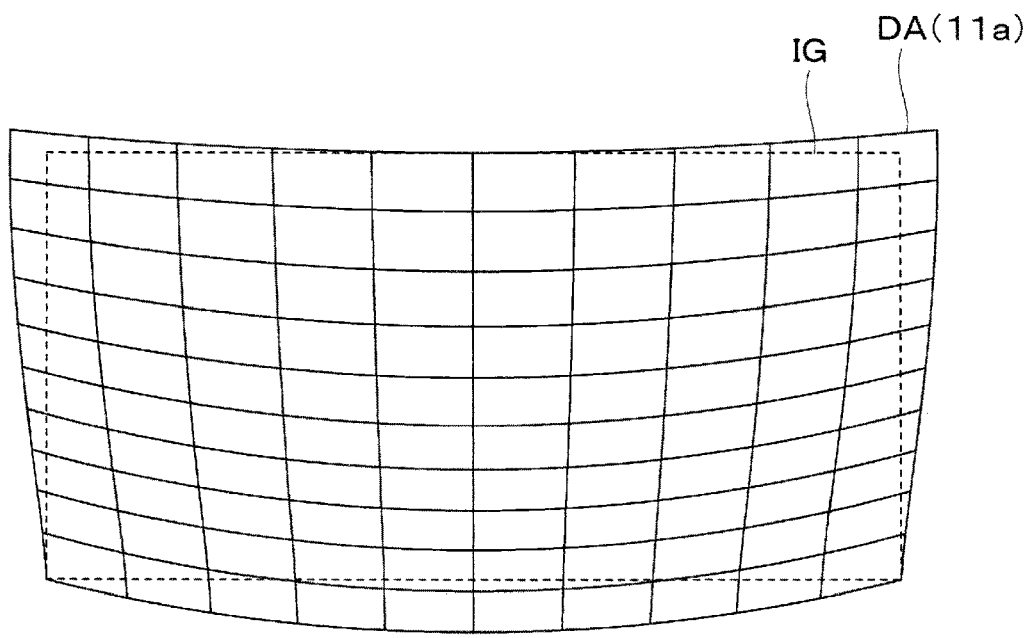
FIG. 6 is a diagram illustrating a compulsory distortion of a display image formed on a display device.

As illustrated in FIG. 6, a display image DA formed on the display surface 11a of the display device 11 is a modification image with a trapezoidal distortion as seen from a distortion of a virtual grid. As described later, since the projection optical system 12 is an eccentric optical system, it is not easy to remove all distortion such as the trapezoidal distortion. Thus, even when the distortion remains in the projection optical system 12, by previously providing the display image DA formed at the display surface 11a with a distortion, a pixel array of a projected image IG of a virtual image observed in a position of the exit pupil EP via the projection optical system 12 can have a grid pattern, and an outline can be rectangular. As a result, the observer US can observe the projection image IG with less distortion, which facilitates correction of the other aberration in the projection optical system 12. The display image (modification image) DA formed at the display surface 11a may be a display image in which a compulsory distortion is formed by image processing. When the display surface 11a is rectangular, a margin is formed by forming a compulsory distortion, but additional information may be displayed in such a margin. The display image (modification image) DA formed at the display surface 11a is not limited to a display image in which a compulsory distortion is formed by image processing, and, for example, an array of display pixels formed at the display surface 11a may correspond to a compulsory distortion. In this case, image processing for correcting the distortion is not needed. Furthermore, the display surface 11a may be curved to correct an aberration.

Referring back to FIG. 3, the projection optical system 12 is a non-coaxial optical system or an eccentric optical system. An eccentric direction of the projection optical system 12 is defined by the arrangement of the first mirror member 21, the second mirror member 22, and the like. Specifically, the first mirror member 21, the second mirror member 22, and the partially reflecting type mirror portion 23 have the eccentric direction set within a YZ plane. In other words, an optical axis AX passing through the first mirror member 21, the second mirror member 22, and the partially reflecting type mirror portion 23 is disposed along a plane that intersects the lateral direction in which a pair of pupils EY of an observer are aligned, i.e., the X direction, and extends in a substantially vertical direction, and more specifically, is disposed along the YZ plane that is orthogonal to the X direction and extends in the vertical direction. The optical axis AX is disposed along the vertical YZ plane, and thus an angle of view in the lateral direction is easily increased. When a plane including the optical axis AX is inclined in a clockwise direction or a counterclockwise direction (i.e., left or right) around the Z axis by a few 10°, an influence on the angle of view is not greatly increased with the optical axis AX extending in the substantially vertical direction. Further, the first mirror member 21 is disposed closer to the top or the +Y of the second mirror member 22 corresponding to closer to the head of the observer US, and the second mirror member 22 is disposed closer to the top or the +Y of the third mirror member 23 corresponding to closer to the head of the observer US. Herein, closer to the top or the +Y is considered with reference to an intersection or a point of contact of each of the mirror members 21, 22, and 23 and the optical axis AX.

Figure 7:
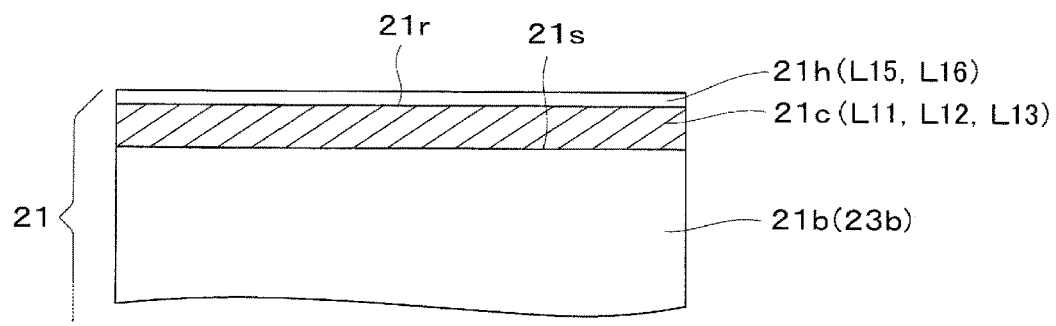
FIG. 7 is an enlarged cross-sectional view illustrating a structure of a reflecting surface of a first mirror member.

The first mirror member 21 is a plate-like component that functions as a concave surface mirror, and reflects the imaging light GL from the display device 11. The first mirror member 21 is a surface reflecting type optical element having a structure in which a mirror film 21c is formed on one surface 21s of a substrate 21b having a thin plate shape, specifically on the surface 21s on the exit pupil EP side (refer to FIG. 7). The surface of the mirror film 21c is covered with a protective layer 21h that is thin. The reflecting surface 21r of the first mirror member 21 is, for example, a free curved surface, and has a shape corresponding to the surface 21s of the substrate 21b. The reflecting surface 21r is not limited to a free curved surface, and may be an aspheric surface. The reflecting surface 21r is equivalent to the first reflecting region R1 (refer to FIG. 1) on which the mirror film 21c of a total-reflection type is formed, is asymmetric across the optical axis AX with respect to the eccentric direction (substantially vertical direction of the paper surface) in the YZ plane, and is symmetric across the optical axis AX with respect to the lateral direction or the X direction (normal line direction of the paper surface) orthogonal to the YZ plane. The substrate 21b of the first mirror member 21 is made of, for example, resin, but may also be made of glass. The mirror film 21c is formed of a single layer film L11 or a multilayer film L12 of metal such as Al and Ag, for example, but may also be a dielectric multilayer film L13. The mirror film 21c may be formed by lamination including a technique such as vapor deposition, but may also be formed by bonding a sheet-shaped reflective film. The protective layer 21h can be a film L15 formed of, for example, a silicon-based hard coat material or silicon oxide, but may also be a dielectric multilayer film L16 to which a reflection enhancing function or a reflection preventing function has been added.

Figure 8:
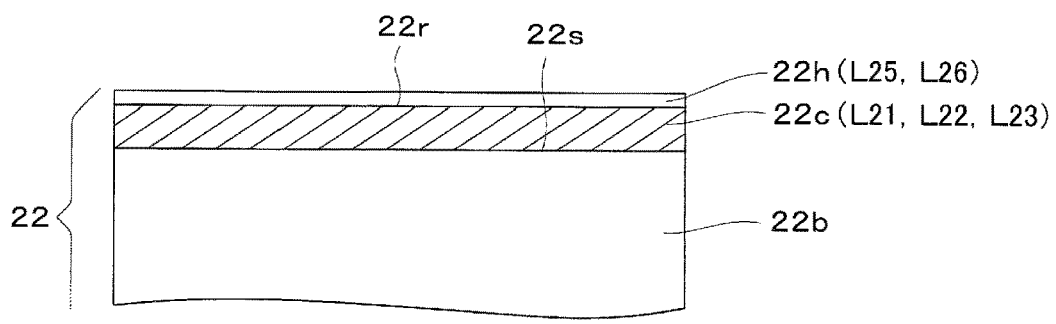
FIG. 8 is an enlarged cross-sectional view illustrating a structure of a reflecting surface of a second mirror member.

The second mirror member 22 is a plate-like component that functions as a convex surface mirror, and reflects the imaging light GL from the first mirror member 21. The second mirror member 22 is a surface reflecting type optical element having a structure in which a mirror film 22c is formed at one surface 22s of a substrate 22b having a thin plate shape (refer to FIG. 8). The surface of the mirror film 22c is covered with a protective layer 22h that is thin. The reflecting surface 22r of the second mirror member 22 is, for example, a free curved surface, and has a shape corresponding to the surface 22s of the substrate 22b. The reflecting surface 22r is not limited to a free curved surface, and may be an aspheric surface. The reflecting surface 22r is asymmetric across the optical axis AX with respect to the eccentric direction (substantially vertical direction of the paper surface) in the YZ plane, and is symmetric across the optical axis AX with respect to the lateral direction or the X direction (normal line direction of the paper surface) orthogonal to the YZ plane. The substrate 22b of the second mirror member 22 is made of, for example, resin, but may also be made of glass. The mirror film 22c is formed of a single layer film L21 or a multilayer film L22 of metal such as Al and Ag, for example, but may also be a dielectric multilayer film L23. The mirror film 22c may be formed by lamination including a technique such as vapor deposition, but may also be formed by bonding a sheet-shaped reflective film. The protective layer 22h can be a film L25 formed of, for example, a silicon-based hard coat material or silicon oxide, but may also be a dielectric multilayer film L26 to which a reflection enhancing function or a reflection preventing function has been added.

The partially reflecting type mirror portion 23 is a plate-like component that functions as a concave surface mirror, and reflects the imaging light GL from the second mirror member 22. The partially reflecting type mirror portion 23 covers a position of the exit pupil EP in which the pupil EY is disposed, and also has a concave shape toward the position of the exit pupil EP. The transmissive type mirror portion 23 and the first mirror member 21 are disposed spaced apart in the vertical direction. The partially reflecting type mirror portion 23 is a surface reflecting type optical element having a structure in which a mirror film 23c is formed at one surface 23s of a substrate 23b having a thin plate shape, specifically on the surface 23s on the exit pupil EP side (refer to FIG. 9). The surface of the mirror film 23c is covered with a protective layer 23h that is thin. The reflecting surface 23r of the partially reflecting type mirror portion 23 is, for example, a free curved surface, and has a shape corresponding to the surface 23s of the substrate 23b. The reflecting surface 23r is not limited to a free curved surface, and may be an aspheric surface. The reflecting surface 23r is equivalent to the second reflecting region R2 (refer to FIG. 1) on which the mirror film 23c of a partially transmissive type is formed, is asymmetric across the optical axis AX with respect to the eccentric direction (substantially vertical direction of the paper surface) in the YZ plane, and is symmetric across the optical axis AX with respect to the lateral direction or the X direction (normal line direction of the paper surface) orthogonal to the YZ plane.

The partially reflecting type mirror portion 23 is a transmissive type reflection element that causes a part of light to transmit upon reflection, and the mirror film 23c of the partially reflecting type mirror portion 23 has a semi-transmissive property. As a result, the external light OL passes through the partially reflecting type mirror portion 23, and thus a see-through view of externals is enabled, and a virtual image can be superimposed on an external image. At this time, as long as the substrate 23b has a thickness of less than or equal to approximately a few millimeters, the substrate 23b is in a state having substantially no optical power and a change in magnification of the external image can be suppressed to low. A reflectance of the mirror film 23c with respect to the imaging light GL and the external light OL is set to be greater than or equal to 10% and less than or equal to 50% in a range of an incident angle of the assumed imaging light GL in terms of securing luminance of the imaging light GL and facilitating the observation of an external image by see-through. The substrate 23b of the partially reflecting type mirror portion 23 is made of, for example, resin, but may also be made of glass. The mirror film 23c is formed of a single layer film L31 or a multilayer film L32 of metal such as Al and Ag, for example, but may also be a dielectric multilayer film L33. The mirror film 23c may be formed by lamination including a technique such as vapor deposition, but may also be formed by bonding a sheet-shaped reflective film. The protective layer 23h can be a film L35 formed of, for example, a silicon-based hard coat material or silicon oxide, but may also be a dielectric multilayer film L36 to which a reflection enhancing function or a reflection preventing function has been added. A reflection preventing film L34 can be formed at the other surface 23t of the substrate 23b via a hard coat layer L30.

As described above, an aberration reduction can be achieved by setting the reflecting surface 21r of the first mirror member 21, the reflecting surface 22r of the second mirror member 22, and the reflecting surface 23r of the partially reflecting type mirror portion 23 to be a free curved surface or an aspheric surface, and, particularly when a free curved surface is used, an aberration of the projection optical system 12 being a non-coaxial optical system or an eccentric optical system can be easily reduced. Note that the free curved surface is a surface without an axis of rotational symmetry, and various polynomials may be used as a surface function of the free curved surface. In addition, the aspheric surface is a surface having an axis of rotational symmetry, but is a paraboloid or a surface other than a spherical surface expressed by a polynomial.

Figure 9:
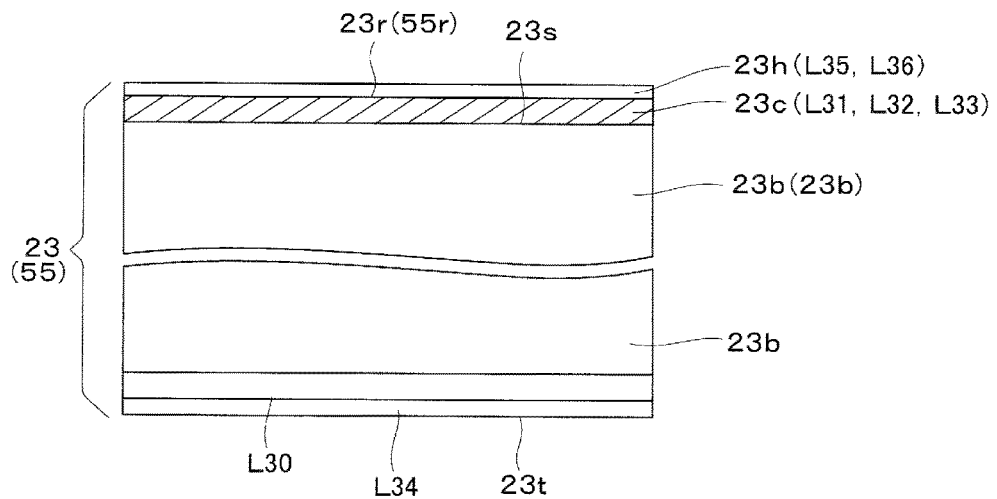
FIG. 9 is an enlarged cross-sectional view illustrating a structure of a reflecting surface and the like of a partially reflecting type mirror portion.

The external-light transmissive region 55 on the outer side surrounding the partially reflecting type mirror portion 23 has the same cross-sectional structure as the cross-sectional structure of the partially reflecting type mirror portion 23 illustrated in FIG. 9. In other words, the mirror film 23c illustrated in FIG. 9 forms the reflecting surface 55r, which is a surface reflecting type.

Figure 10:
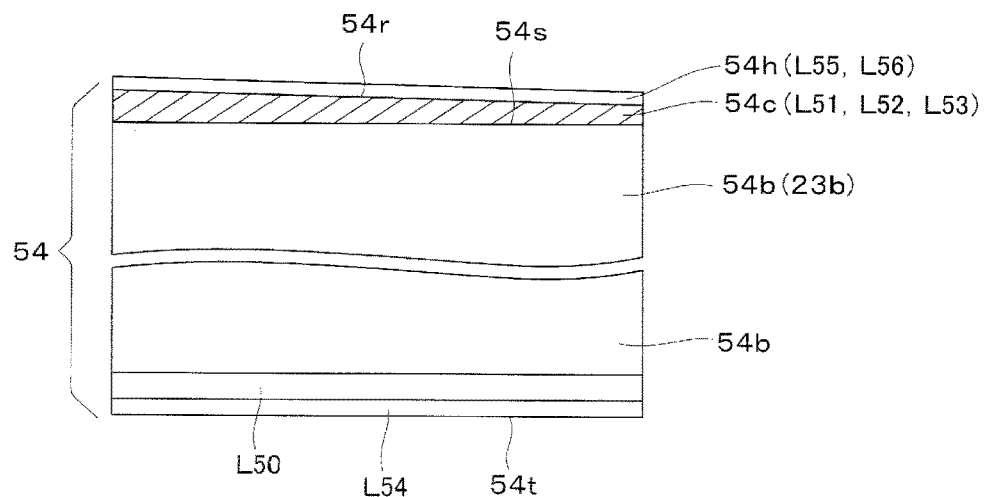
FIG. 10 is an enlarged cross-sectional view illustrating a structure of a reflecting surface and the like of a gradation region.

As illustrated in FIG. 10, the gradation region 54 is a region in which the transmittance changes in the vertical direction, and has a structure in which a mirror film 54c is formed at one surface 54s of a substrate 54b having a thin plate shape. The surface of the mirror film 54c is the reflecting surface 54r, and is covered with a thin protective layer 54h. The mirror film 54c has the same structure as the mirror film 23c of the partially reflecting type mirror portion 23. However, for example, the film thickness decreases from top to bottom, and is given a gradient in reflectance and transmittance. The mirror film 54c is formed of a single layer film L51 or a multilayer film L52 of metal such as Al and Ag, for example, but may also be a dielectric multilayer film L53. The protective layer 54h can be a film L55 formed of, for example, a silicon-based hard coat material or silicon oxide, but may also be a dielectric multilayer film L56 to which a reflection enhancing function or a reflection preventing function has been added. A reflection preventing film L54 can be formed at the other surface 54t of the substrate 54b via a hard coat layer L50. In a case where the mirror film 54c is made of films L51 and L52 of metal, the film thickness can be given a gradient by blurring an edge of a mask during vapor deposition or the like. When the mirror film 54c is the dielectric multilayer film L56, a thickness and a refractive index of a refractive layer constituting the dielectric multilayer film L56 can be adjusted to give the reflectance a gradient.

In the above, the substrate 21b serving as the base material of the first mirror member 21, the substrate 23b serving as the base material of the partially reflecting type mirror portion 23, and the substrate 54b serving as the base material of the gradation region 54 can be integrally formed from a common material, and can be molded individually and integrated by an adhesive. The substrates 21b, 23b, 54b are formed of, for example, polycarbonate when integrally formed, but the material is not limited to polycarbonate. The reflecting surface 21r of the first mirror member 21 and the reflecting surface 23r of the partially reflecting type mirror portion 23 are free curved surfaces, and thus can be a common optical surface. The reflecting surface 55r of the external-light transmissive region 55 and the reflecting surface 54r of the gradation region 54 are surfaces in which the reflecting surface 21r and 23r are extended seamlessly, and can be part of a free curved surface, but may be a unique surface imparted with continuity such that a bent surface is not formed.

A distance in the Z direction between the second mirror member 22 and the position of the exit pupil EP and a distance in the Z direction between the partially reflecting type mirror portion 23 and the position of the exit pupil EP are set to be greater than or equal to 14 mm, and a space in which the eyeglasses are disposed is secured.

The intermediate image II is formed between the second mirror member 22 and the partially reflecting type mirror portion 23. The intermediate image II is formed by appropriately enlarging an image formed at the display surface 11a of the display device 11.

Figure 11:
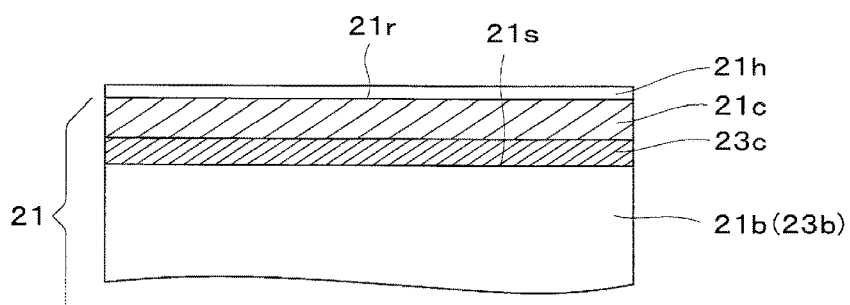
FIG. 11 is a diagram illustrating a modification example of the reflecting surface of the first mirror member.
Figure 12:
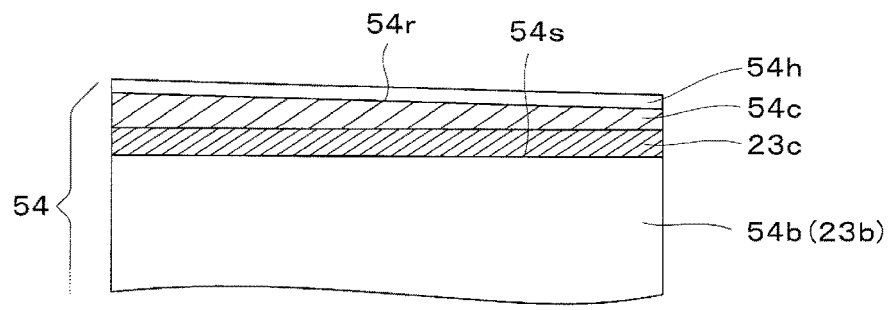
FIG. 12 is a diagram illustrating a modification example of the reflecting surface of the gradation region.

FIG. 11 is a diagram illustrating a modification example of the cross-sectional structure of the first mirror member 21, and FIG. 12 is a diagram illustrating a modification example of the cross-sectional structure of the gradation region 54. In this case, the first mirror member 21 and the gradation region 54 have a structure in which the mirror film 23c is formed as a foundation of the mirror films 21c and 54c. In other words, the mirror film 21c, which is total reflection type, is layered on a mirror film 32c, which is partially transmissive type and formed at the substrates 21b and 23b, from inside the first reflecting region R1 corresponding to the first mirror member 21 to an outer edge of the second reflecting region R2 corresponding to the partially reflecting type mirror portion 23. The mirror film 23c serving as the foundation is common to the partially reflecting type mirror portion 23, and is formed collectively when forming the partially reflecting type mirror portion 23. With the mirror films 21c and 54c thus formed at the mirror film 23c, it becomes easy to continuously change the transmittance and the reflectance at a junction of the gradation region 54 with the transmissive region 51 or a junction of the gradation region 54 with the light blocking region 52, making it easy to make the junction unnoticeable. The above is exemplary, and the mirror film 23c serving as a foundation may have a structure in which the mirror film 23c serving as a foundation is provided up to the gradation region 54, but not to the first mirror member 21.

Figure 13:
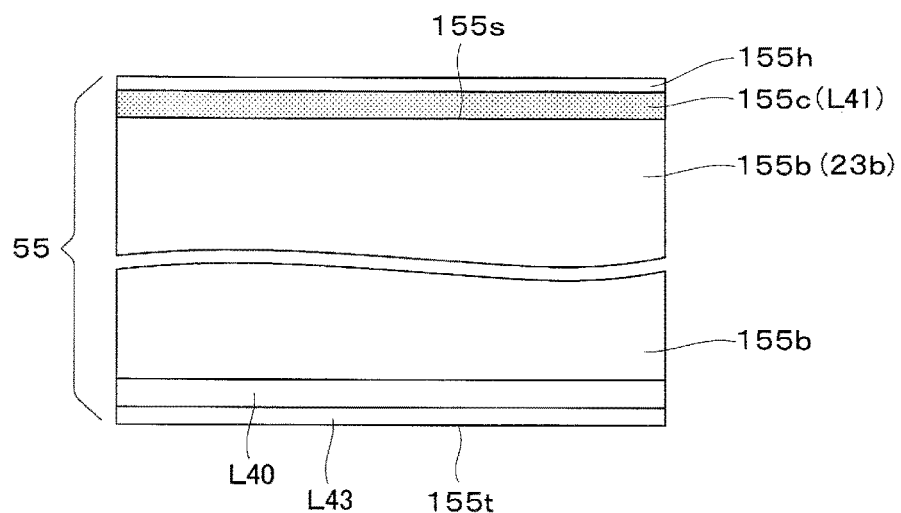
FIG. 13 is a diagram illustrating a modification example of a cross-sectional structure of an external-light transmissive region.

FIG. 13 is a diagram illustrating a modification example of a cross-sectional structure of the external-light transmissive region 55 around the partially reflecting type mirror portion 23. In this case, the external-light transmissive region 55 has a structure in which a dimming layer 155c is formed on one surface 155s of a substrate 155b having a thin plate shape. The substrate 155b is a portion common to the substrate 23b of the partially reflecting type mirror portion 23. The dimming layer 155c may be, for example, a neutral-density (ND) filter L41 or the like. When the dimming layer 155c is the ND filter L41, a light-absorbing resin film can be applied on the surface 155s, and a light-absorbing inorganic material can also be deposited on the surface 155s. The substrate 155b can be formed by two-color molding with the substrate 23b and, in this case, a bulk transmittance of the substrate 155b can be freely lowered below a bulk transmittance of the substrate 23b. A protective layer 155h including a reflection preventing film can be formed at a surface of the dimming layer 155c, and a reflection preventing film L43 can be formed at the other surface 155t of the substrate 155b via a hard coat layer L40.

Figure 14:
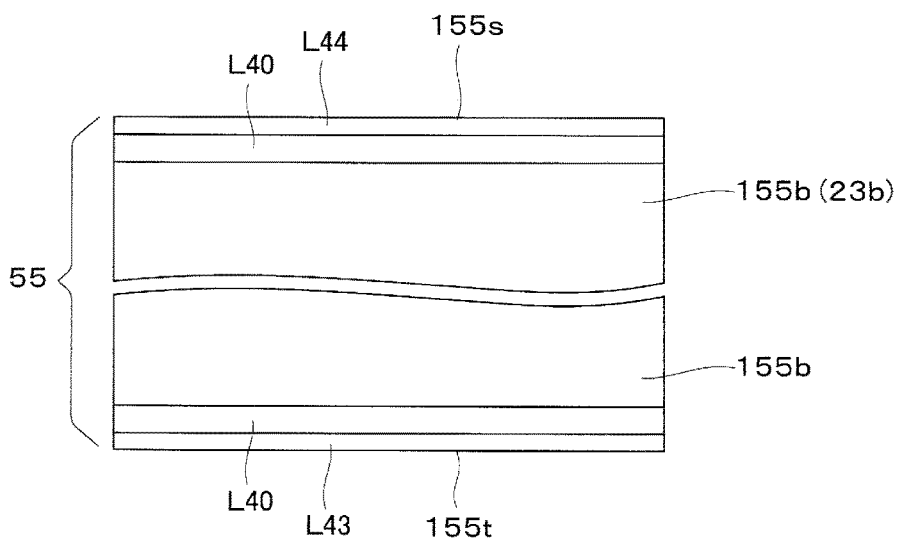
FIG. 14 is a diagram illustrating another modification example of a cross-sectional structure of the external-light transmissive region.

As illustrated in FIG. 14, the external-light transmissive region 55 can be a structure including the substrate 155b having a thin plate shape without a dimming layer being formed. The substrate 155b is formed from a material that is not light absorbing, but may be formed from a material that is light absorbing. The reflection preventing film L44 and L43 can be formed at the surfaces 155s and 155t of the substrate 155b via the hard coat layer L40.

The first mirror member 21 and the partially reflecting type mirror portion 23 described above are not limited to surface reflecting type surface mirrors, and may be inner surface reflecting type inner mirrors including the mirror films 21c and 23c formed at rear surfaces of the substrates 21b and 23b.

The reflection preventing film L34 of the partially reflecting type mirror portion 23, the reflection preventing film L43 of the external-light transmissive region 55, and the reflection preventing film L54 of the gradation region 54 do not directly affect optical performance, and therefore can be non-glare types that generate scattering.

According to the virtual image display apparatus 100 of the first exemplary embodiment described above, the virtual image display apparatus 100 includes the image optical system 112 including the first mirror member (outer mirror member) 21, and the partially reflecting type mirror portion 23 configured to reflect the imaging light GL emitted from the image optical system 112 toward the position of the exit pupil EP. The first mirror member (outer mirror member) 21 and the partially reflecting type mirror portion 23 are integrated, making it possible to reduce the effect of the junction of the first mirror member 21 and the partially reflecting type mirror portion 23, making it easy to secure a wide see-through visual field, particularly on the first mirror member (outer mirror member) 21 side of the area surrounding the partially reflecting type mirror portion 23.

Second Exemplary Embodiment

Hereinafter, a virtual image display apparatus according to a second exemplary embodiment will be described. Note that the virtual image display apparatus according to the second exemplary embodiment is obtained by partly modifying the virtual image display apparatus according to the first exemplary embodiment, and description on common portions is omitted.

Figure 15:
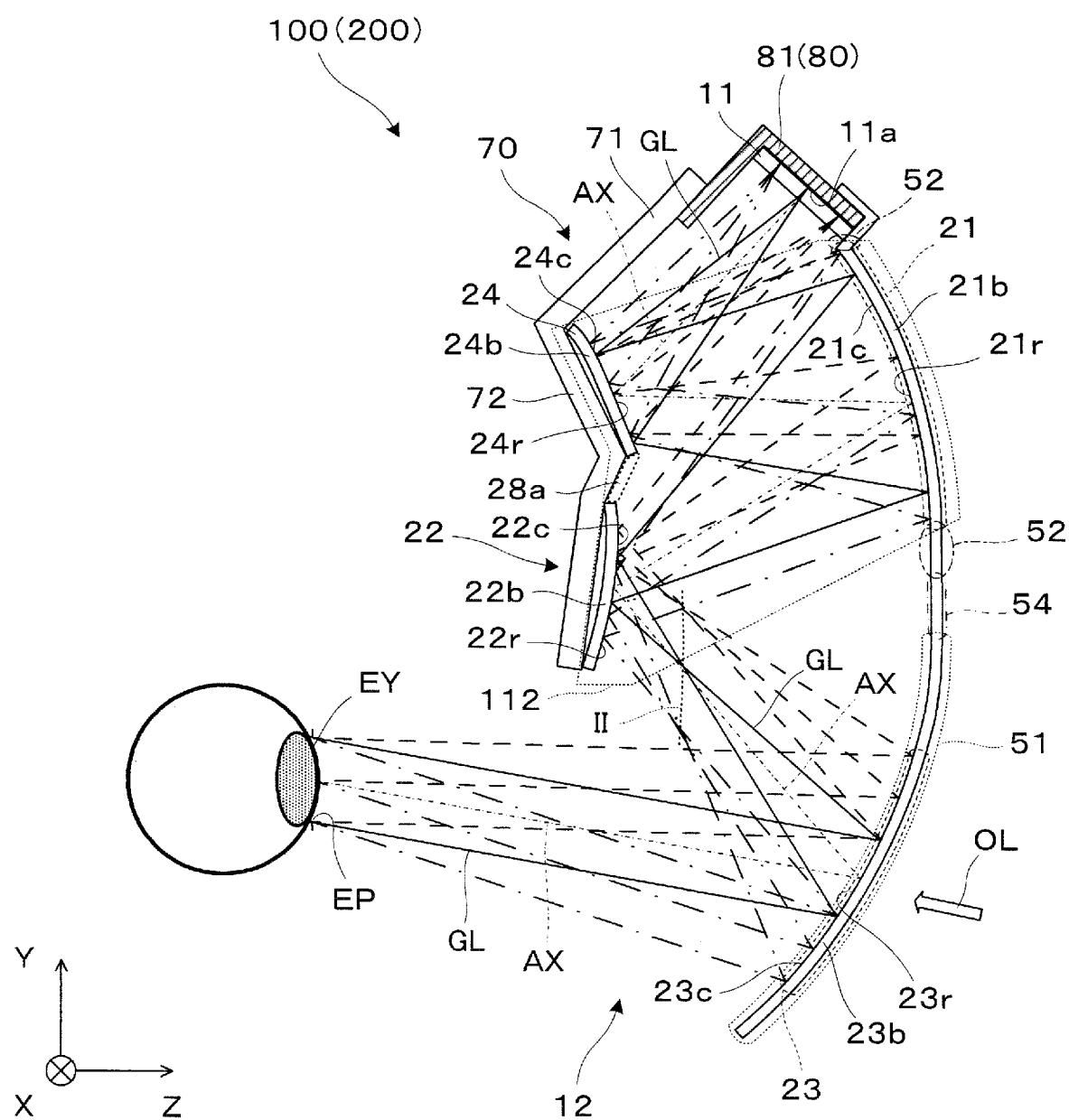
FIG. 15 is a side cross-sectional view illustrating a virtual image display apparatus according to a second exemplary embodiment.
Figure 16:
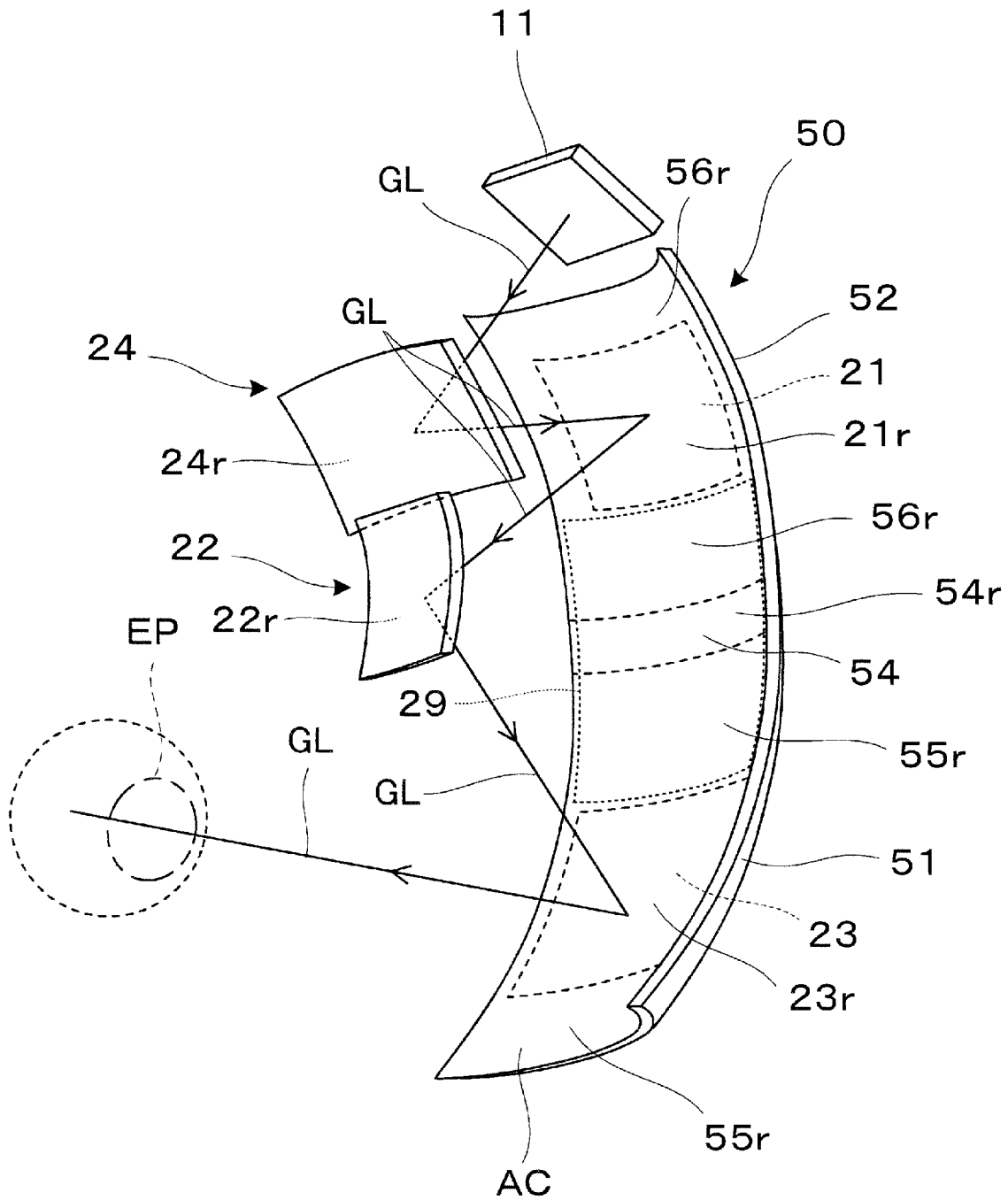
FIG. 16 is a perspective view illustrating an arrangement relationship between the optical elements.

As illustrated in FIGS. 15 and 16, the virtual image display apparatus 100 in the second exemplary embodiment includes, as the projection optical system 12, the first mirror member 21, the second mirror member 22, and the partially reflecting type mirror portion 23, similarly to the first exemplary embodiment, but further includes a third mirror member 24 on an optical path between the display device (image forming unit) 11 and the first mirror member 21. The second mirror member 22 and the third mirror member 24 are disposed vertically side by side, and the display device 11 is disposed above the first mirror member 21.

The third mirror member 24 is a plate-like component that functions as a convex surface mirror, and reflects the imaging light GL from the display device 11, making the light incident on the first mirror member 21. The third mirror member 24 has a structure similar to that of the first mirror member 21, and has a structure in which a mirror film 24c is formed at a substrate 24b. The surface of the mirror film 24c is covered with a thin protective layer (not illustrated). A reflecting surface 24r of the third mirror member 24 is, for example, a free curved surface, and has a shape corresponding to a surface of the mirror film 24c. The reflecting surface 24r is not limited to a free curved surface, and may be an aspheric surface. The substrate 24b of the third mirror member 24 is made of, for example, resin, but may also be made of glass. The mirror film 24c is formed of a single layer film or a multilayer film of metal such as Al and Ag, for example, but may also be a dielectric multilayer film.

Of the image optical system 112, the third mirror member 24 and the second mirror member 22 are fixed vertically adjacent to each other to the rear wall portion 72 of the upper cover member (body cover member) 70. The display device 11 is directly fixed to the body member 81 of the frame 80 upwardly adjacent to the first mirror member 21. The first mirror member 21 along with the partially reflecting type mirror portion 23 are fixed to the body member 81 of the frame 80 as a part of the front cover member 50. The first mirror member 21 and the partially reflecting type mirror portion 23 are integrated as a part of the front cover member 50. In this case, the display device 11, the first mirror member 21, and the partially reflecting type mirror portion 23 are arranged vertically along an arc.

Similar to the first exemplary embodiment, the transmissive region 51 of the front cover member 50 includes the partially reflecting type mirror portion 23 and the external-light transmissive region 55 disposed around the partially reflecting type mirror portion 23. The light blocking region 52 of the front cover member 50 includes the first mirror member 21 and the external light blocking region 56 disposed around the first mirror member 21. That is, the first mirror member 21 and the partially reflecting type mirror portion 23 are disposed vertically side by side. The gradation region 54 in which the reflectance or the transmittance gradually change is formed between the transmissive region 51 and the light blocking region 52, the transmittance and the reflectance continually gradually change from the transmissive region 51 to the light blocking region 52, and the reflectance and transmittance continually gradually change from the partially reflecting type mirror portion 23 to the first mirror member (outer mirror member) 21.

The second mirror member 22 and the third mirror member 24 can be integrated using a joining portion 28a (refer to FIG. 15). In this case, the second mirror member 22 and the third mirror member 24 can be treated as one component, facilitating assembly while maintaining precision.

Third Exemplary Embodiment

Hereinafter, a virtual image display apparatus according to a third exemplary embodiment will be described. Note that the virtual image display apparatus according to the third exemplary embodiment is obtained by partly modifying the virtual image display apparatus according to the first exemplary embodiment, and a description of common portions is omitted.

Figure 17:
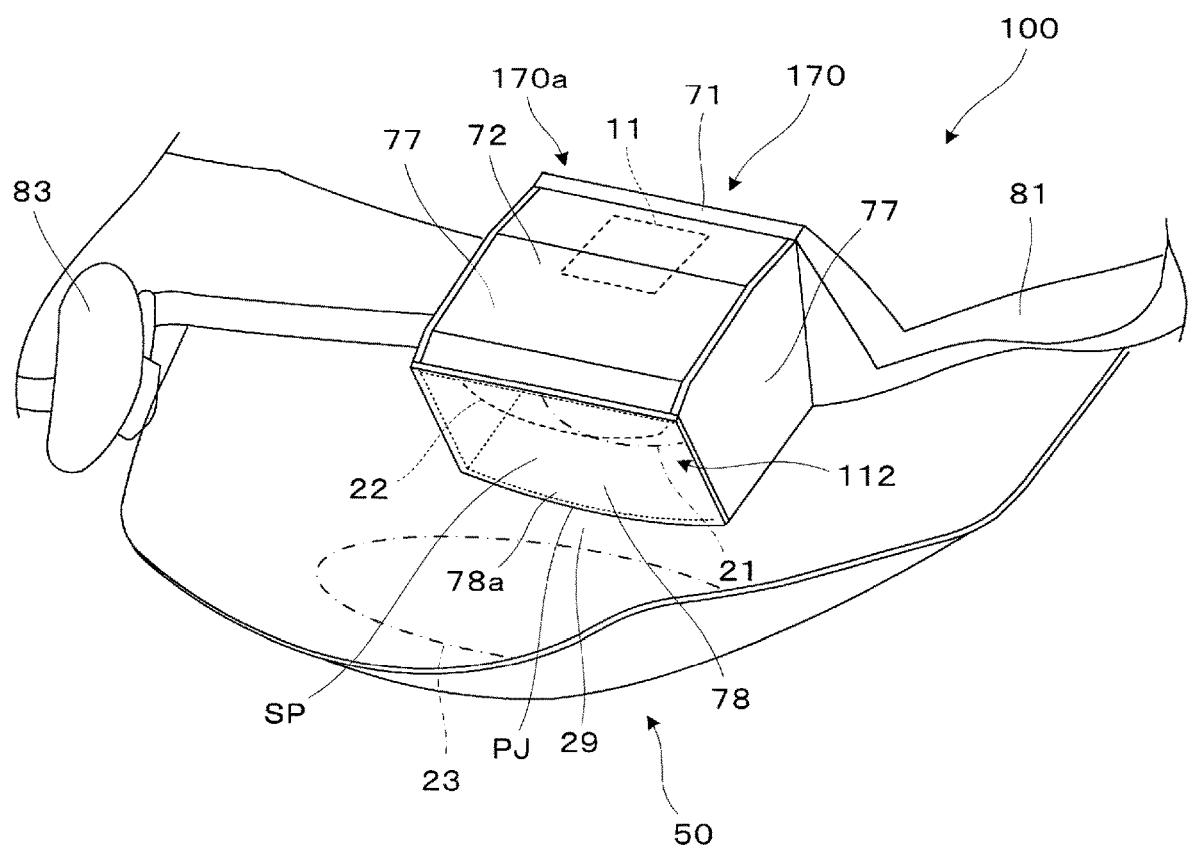
FIG. 17 is a perspective view illustrating a main portion of the virtual image display apparatus according to a third exemplary embodiment.
Figure 18:
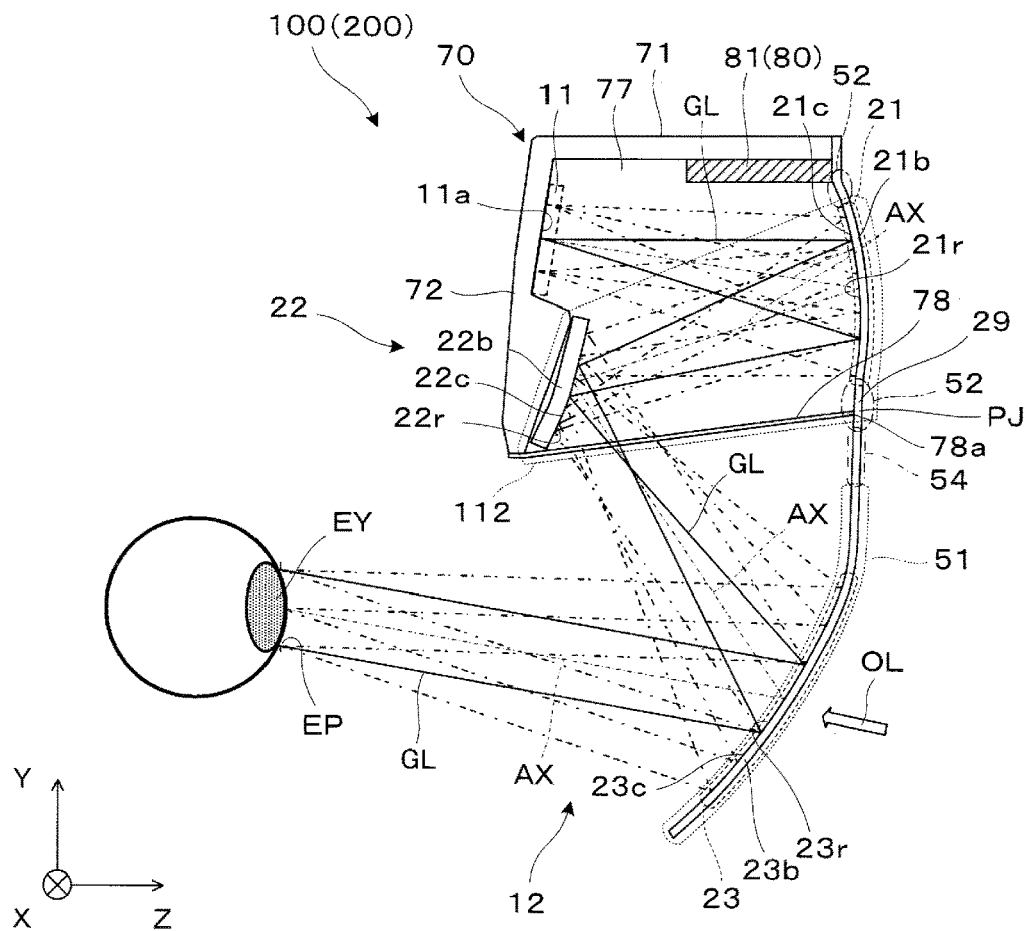
FIG. 18 is a side cross-sectional view illustrating an optical system of the virtual image display apparatus according to the third exemplary embodiment.

FIG. 17 is a perspective view illustrating a main portion of the virtual image display apparatus according to the third exemplary embodiment, and FIG. 18 is a side cross-sectional view illustrating an optical system of the virtual image display apparatus according to the third exemplary embodiment.

As illustrated in FIG. 17, the display device (image forming unit) 11 and the image optical system 112 are housed in a case 170. In addition to the upper cover member 70, the case 170 includes a pair of side wall portions 77 and a protective member 78, and forms a housing space SP in cooperation with the first mirror member 21 and a portion around the first mirror member 21 of the front cover member 50. The upper cover member 70 is formed of a material having a light shielding property, includes the upper side wall portion 71 and the rear wall portion 72, the rear wall portion 72 supports the display device 11 and the second mirror member 22. The side wall portion 77 is a plate-like member formed of a material having a light shielding property, and is joined to the upper cover member 70 by an adhesive or a sticking agent on an upper side and a side. A cover member 170a is configured by the upper cover member 70 and the side wall portion 77. The protective member 78 is formed from a material that has optical transparency and causes the imaging light GL to pass through without attenuation, and caps the cover member 170a from below. The protective member 78 is fixed to the side wall portion 77 at a pair of sides, and is fixed to the rear surface wall portion 72 side of the upper cover member 70 at a rear side. A front side unit 78a of the protective member 78 is joined to the coupling portion 29 that links the first mirror member (outer mirror member) 21 and the partially reflecting type mirror portion 23 of the front cover member 50. As a result, the display device 11, the first mirror member 21, and the second mirror member 22 are housed in the storage space SP in a sealed state, and have a role in preventing dust, exposure, and contact with the optical surface.

As illustrated in FIG. 18, the protective member 78 has a uniform thickness and is united to a uniting location PJ that is the lower end side of the light blocking region 52 of the front cover member 50 and extends in a lateral direction at the coupling portion 29 linking the first mirror member 21 and the partially reflecting type mirror portion 23. The protective member 78 has a uniform thickness and transmittance and extends flat in a parallel plate shape in order to make the effect on the imaging light GL uniform. In other words, the protective member 78 has no optical power.

Figure 19:
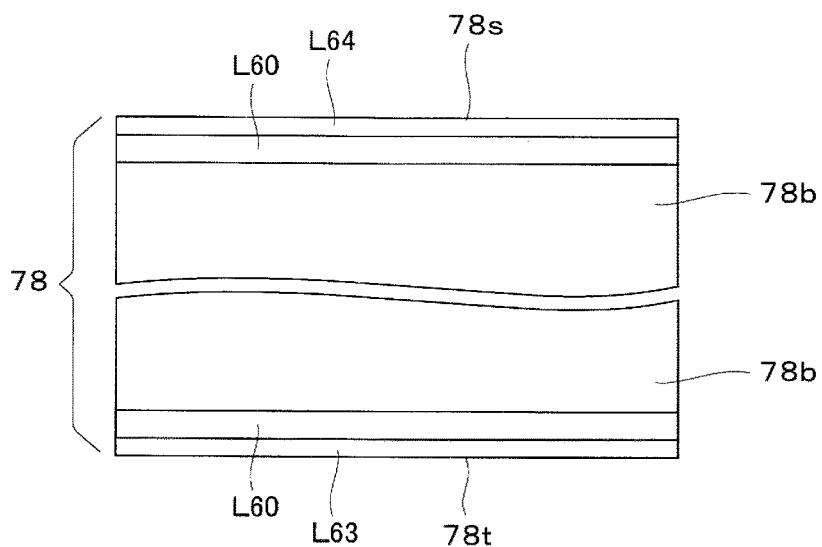
FIG. 19 is an enlarged cross-sectional view illustrating a structure of a protective member.

A cross-sectional structure of the protective member 78 will be described with reference to FIG. 19. The protective member 78 is formed from a substrate 78b having a thin plate shape which is formed from a material having a transmittance of 90% or greater. Reflection preventing films L64 and L63 can be formed at surfaces 78s and 78t of the substrate 78b via a hard coat layer L60.

In the above, the uniting location PJ of the protective member 78 is the lower end of the light blocking region 52, but the uniting location PJ of the protective member 78 may be the gradation region 54.

The housing space SP of the case 170 is not limited to being sealed, and an airway that communicates with the outside can be provided in part. Note that a heat dissipation mechanism may be provided to the rear wall portion 72 that supports the display device 11.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

For the outer peripheral portion of the front cover member 50, the transmittance can be reduced or blocked.

Although a description has been omitted above, a hard coat layer can be formed as a foundation of the mirror films 21c, 22c, 23c, 24c and 54c, and a hard coat layer can be formed at the surface of the mirror films 21c, 22c, 23c, 24c and 54c. When the hard coat layer is formed on the surface of the mirror film, a reflection preventing film can be formed on the hard coat layer.

In the virtual image display apparatus 100 in the above-described exemplary embodiments, a self-luminous type display element such as an organic EL element is used as the display device 11. Instead, a configuration in which a laser scanner obtained by combining a laser light source and a scanner, such as a polygon mirror, may also be used as the display device 11.

The second mirror member 22 can be a refractive reflective optical member obtained by combining a refractive surface with the reflecting surface 22r. In this case, the refractive surface can be a free curved surface or the like, and further contributes in improving the performance of the projection optical system 12. The third mirror member 24 can also be a refractive reflective optical member.

A light control device that controls light by limiting the transmitted light of the partially reflecting type mirror portion 23 may be attached to the external side of the partially reflecting type mirror portion 23. The light control device adjusts a transmittance, for example, electrically. Mirror liquid crystals, electronic shades, and the like may be used as the light control device. The light control device may adjust transmittance according to external light brightness.

When the light control device blocks the external light OL, only a virtual image that is not affected by an external image can be observed.

Further, the virtual image display apparatus of the claimed disclosure may also be compatible with a so-called see-through video product constituted by a virtual image display apparatus and an imaging device.

The mirror film 23c of the partially reflecting type mirror portion 23 is not limited to the mirror film 23 having a general semi-transmissive property, and may be configured to reflect a specific polarization component, such as a wire grid element. The mirror film 23c of the partially reflecting type mirror portion 23 may also be constituted by a volume hologram or the other hologram element, or may also be constituted by a diffraction grating.

In the description above, the virtual image display apparatus 100 is assumed to be mounted and used on a head, but the virtual image display apparatus 100 described above may also be used as a hand-held display that is not mounted on a head and is viewed into like a pair of binoculars. In other words, the head-mounted display also includes a hand-held display in the present disclosure.

What is claimed is:

1. A virtual image display apparatus comprising:
   an image forming unit;
   an image optical system including an outer mirror member and configured to receive imaging light from the image forming unit;
   a partially reflecting type mirror portion configured to reflect imaging light emitted from the image optical system toward a position of an exit pupil;
   a body cover member configured to cover the image forming unit and the image optical system; and
   a protective member formed of a material having optical transparency, and extending from a coupling portion linking the outer mirror member and the partially reflecting type mirror portion, the protective member being configured to cap the body cover member, wherein
   the outer mirror member and the partially reflecting type mirror portion are integrated.

2. The virtual image display apparatus according to claim 1, wherein
   an optical state continuously changes from the outer mirror member to the partially reflecting type mirror portion.

3. The virtual image display apparatus according to claim 2, wherein
   a reflectance gradually changes from the partially reflecting type mirror portion to the outer mirror member.

4. The virtual image display apparatus according to claim 1, wherein
   the partially reflecting type mirror portion and the coupling portion between the partially reflecting type mirror portion and the outer mirror member have substantially no optical power with respect to transmitted light.

5. The virtual image display apparatus according to claim 1, comprising an external-light transmissive region around the partially reflecting type mirror portion.

6. The virtual image display apparatus according to claim 5, wherein
   the external-light transmissive region is located in a position upward 15° or greater from a horizontal direction.

7. The virtual image display apparatus according to claim 5, wherein
   the external-light transmissive region extends to a position upward 55° or greater from the horizontal direction, the position being an upper limit of the extension.

8. The virtual image display apparatus according to claim 5, comprising a front cover member configured by integrating a light blocking region including the outer mirror member, and a transmissive region including the partially reflecting type mirror portion and the external-light transmissive region.

9. The virtual image display apparatus according to claim 8, wherein
   the front cover member includes a gradation region between the light blocking region and the transmissive region, the gradation region having a reflectance gradually changing.

10. The virtual image display apparatus according to claim 8, wherein
    a transmittance of visible light in the transmissive region is from 50% to 90%.

11. The virtual image display apparatus according to claim 1, wherein
    the outer mirror member includes a total-reflection type reflective film.

12. The virtual image display apparatus according to claim 1, wherein
    the outer mirror member and the partially reflecting type mirror portion respectively correspond to a first reflecting region and a second reflecting region formed at a substrate having a plate shape.

13. The virtual image display apparatus according to claim 12, wherein
    a total-reflection type mirror film is formed at the substrate in the first reflecting region, and
    a partially transmissive type mirror film is formed at the substrate in the second reflecting region.

14. The virtual image display apparatus according to claim 13, wherein
    the partially transmissive type mirror film and the total-reflection type mirror film are formed at a surface of the substrate at an exit pupil side, and
    the total-reflection type mirror film is layered on the partially transmissive type mirror film at the substrate from inside the first reflecting region to an outer edge of the second reflecting region.

15. The virtual image display apparatus according to claim 1, wherein
    the coupling portion is located outside an effective region.

16. The virtual image display apparatus according to claim 1, wherein
    the image optical system includes, as the outer mirror member, a first mirror member configured to reflect imaging light from the image forming unit, and a second mirror member configured to reflect imaging light reflected by the first mirror member,
    the first mirror member and the partially reflecting type mirror portion are disposed vertically side by side and integrated, and
    the image forming unit and the second mirror member are disposed one on top of the other.

17. The virtual image display apparatus according to claim 16, wherein
    the first mirror member and the second mirror member at different positions with respect to the horizontal direction are disposed to partially overlap, and
    the first mirror member and the partially reflecting type mirror portion are formed of a same substrate.

18. The virtual image display apparatus according to claim 16, wherein
the front cover member includes a gradation region having a reflectance gradually changing from the partially reflecting type mirror portion to the first mirror member, and
the gradation region extends upward from a lower end position of the second mirror member.

19. The virtual image display apparatus according to claim 16, wherein
the second mirror member is fixed at an upper end thereof and suspended by the body cover member.

20. The virtual image display apparatus according to claim 16, wherein
a lateral width of the second mirror member is greater than a lateral width of the first mirror member.

21. The virtual image display apparatus according to claim 1, wherein
the image optical system includes a third mirror member configured to reflect imaging light from the image forming unit, a first mirror member serving as the outer mirror member and configured to reflect imaging light reflected by the third mirror member, and a second mirror member configured to reflect imaging light reflected by the first mirror member,
the first mirror member and the partially reflecting type mirror portion are disposed vertically side by side and integrated,
the second mirror member and the third mirror members are disposed one on top of the other, and
the image forming unit is disposed above the first mirror member.

22. The virtual image display apparatus according to claim 1, wherein
a reflecting surface of the partially reflecting type mirror portion has an aspherical surface or a free curved surface covering a position of the exit pupil and shaped concave toward the position of the exit pupil.

23. The virtual image display apparatus according to claim 1, wherein
the image forming unit displays a distorted modification image for correcting a distortion aberration by the first mirror member, the second mirror member, and the third mirror member.

24. A virtual image display apparatus comprising:
an image forming unit;
an image optical system including an outer mirror member and configured to receive imaging light from the image forming unit; and
a partially reflecting type mirror portion configured to reflect imaging light emitted from the image optical system toward a position of an exit pupil, wherein
the outer mirror member and the partially reflecting type mirror portion are integrated,
the outer mirror member and the partially reflecting type mirror portion respectively correspond to a first reflecting region and a second reflecting region formed at a substrate having a plate shape,
a total-reflection type mirror film is formed at the substrate in the first reflecting region,
a partially transmissive type mirror film is formed at the substrate in the second reflecting region,
the partially transmissive type mirror film and the total-reflection type mirror film are formed at a surface of the substrate at an exit pupil side, and
the total-reflection type mirror film is layered on the partially transmissive type mirror film at the substrate from inside the first reflecting region to an outer edge of the second reflecting region.

* * * * *